June 15, 1926.
N. A. CHRISTENSEN
1,588,660
BRAKING APPARATUS FOR VEHICLES
Filed Dec. 15, 1924
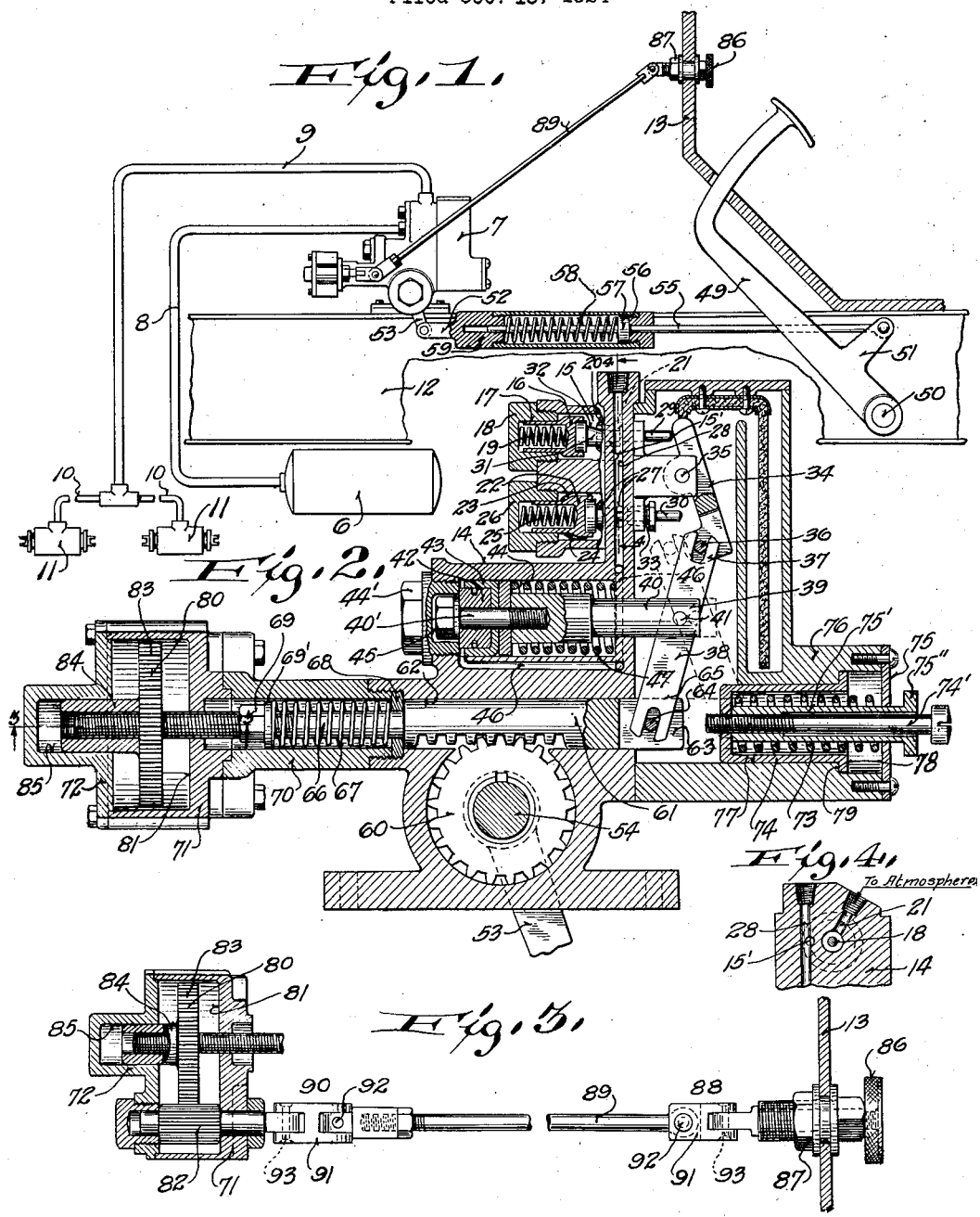
INVENTOR.
Niels A. Christensen
BY
Quarles & French
ATTORNEYS Patented June 15, 1926.

1,588,660

UNITED STATES PATENT OFFICE.

NIELS A. CHRISTENSEN, OF MILWAUKEE, WISCONSIN.

BRAKING APPARATUS FOR VEHICLES.

Application filed December 15, 1924. Serial No. 755,989.

The invention relates to brake systems for automotive vehicles and trailers for such vehicles.

In the use of fluid-pressure-operated brakes on automotive vehicles, it is desirable to provide means, under the control of the operator, for adjusting the braking pressure used to suit varying conditions of operation. Thus, where vehicles are being operated on wet and slippery pavements, it is desirable to use less fluid pressure on the brake upon making a brake application, to avoid possible locking of the wheels and skidding, than when the road conditions are satisfactory for greater braking pressures applied to the wheels. The object of this invention is to provide mechanism for accomplishing the above mentioned results.

The invention further consists in the several features hereinafter set forth and more particularly defined by claims at the conclusion hereof.

In the drawings: Fig. 1 is an elevation view of a braking system embodying the invention, parts being shown in section;

Fig. 2 is a vertical sectional view through the control valve mechanism shown in Fig. 1;

Fig. 3 is a detail sectional view taken on the line 3—3 of Fig. 2, with parts shown in plan.

Fig. 4 is a detail sectional view taken on the line 4—4 of Fig. 1.

In the drawings the numeral 6 designates a reservoir for containing fluid under pressure, 7 the control valve mechanism connected by pipe 8 with said reservoir, whereby compressed air from the reservoir 6 may pass through to a pipe 9 having branches 10 connected to the brake cylinders 11 which it will be understood are suitably associated with the brake members for the wheels of the vehicle of which the side frame 12 and dash board 13 are shown.

The control valve mechanism, as shown in Fig. 2, includes a casing 14 having a relief valve chamber 15, a relief valve 16 having a tubular portion 17 slidably mounted in the bore of a box nut 18 and closed or urged against its seat by a spring 19, said valve controlling the passage of air from chamber 15 to ducts 20 and 21 leading to atmosphere.

An inlet valve 22 is mounted in a chamber 23 supplied with pressure fluid from the pipe 8 through a port 24, and is similar in construction to the relief valve and similarly mounted and acted upon by a spring 25 between it and the box nut 26, said valve controlling the passage of compressed air through a duct 27 to a duct 28 connected to the brake pipe 9. The chamber 15 communicates with the duct 28 through a duct 15'.

Each of the valves 16 and 22 are similarly opened against pressure of their spring by operating pins 29 and 30. Each of these pins has a head 31 fitting closely in the bore formed by the duct 20 or 27, with the exception of a wedge-shaped face 32 which gradually increases the effective port opening as the pin is moved inward. The stems of the pins 29 and 30 are slidably mounted in the casing and project beyond the same, the stem 30 passing through a stuffing box 33 of any suitable construction.

The pins 29 and 30 are operated by a lever 34 pivotally mounted intermediate its ends between the stems of the pins on a pin 35 carried by the casing, said lever having a forked end carrying a pin 36 engaged by the slotted upper end 37 of an operating lever 38.

The lever 38 is pivotally mounted intermediate its ends in the forked end 39 of a fulcrum-shifting rod or support 40 to which it is connected by a pivot pin 41. The connection between the end 37 of said lever and the lever 34 forms a lost-motion connection between them which provides for a "lap" position of the valves. The rod 40 is slidably mounted in the casing and secured by a bolt 40' to the head 42 of a suitably packed compensating piston 43 which works in the bore 44 of the casing 14 and forms therewith and with an end-plug 44' a pressure chamber 45 which connects by a duct 46 with the duct 28, whereby the pressure of air in the brake system is used to shift the rod 40 and hence change the fulcrum point of the lever 38. This pressure is counteracted by a spring 47 interposed between the inner end of the bore 44 and the piston head, and the piston is also limited in its movement by a shoulder 48 on the rod engageable with the inner end of the bore.

As shown in Fig. 1, the foot pedal 49 is pivotally mounted in a pin 50 carried by the frame 12 of the vehicle and is provided with an arm 51 operatively connected by a link 52 with a crank arm 53 on a shaft 54 suitably journalled in the casing. This link 52 is of a type which allows relative motion between the pedal 49 and the parts it actuates and is shown as formed by a rod 55 and a cylinder 56, the rod 55 having a head 57. A spring 58 is mounted within the cylinder 56 between the head 57 and the end 59 of said cylinder, with the result that movement of the rod 55 by the pedal is transmitted through the spring 58 to the other part of the link, including the cylinder, so that the link may move as a unit, or in case the arm 53 is prevented from moving the continued operation of the pedal 49 will cause a movement of the rod 55 relative to the cylinder 56 and in opposition to the spring 58.

The shaft 54 carries a pinion 60 which meshes with a rack 61 slidably mounted in a bore 62 in the casing. This rack has a slotted end 63 carrying a pin 64 engaging with the lower slotted end 65 of the lever 38. One end 66 of the rack is of reduced diameter and a spring 67 interposed between a relatively stationary washer 68 and a washer 69' adjacent a nut 69 on the reduced threaded end 66 serves to normally hold the rack 61 in a position in which the lever 38 holds the lever 34 in its full-line position with the relief valve 16 open. This spring 67 may also act through the rack 62', pinion 60, arm 53 and link 55 to hold the foot pedal 52 in an inoperative position, or an additional spring may be associated with the foot pedal for this purpose. The spring and the end 66 of the rack are enclosed in a tubular member 70 carrying a casing 71 provided with a cover 72. A strong spring 73 is mounted between the closed end of a slidable hollow stop member 74 and an end plate 75 secured to the cover 76 of the casing 14. This stop member is slidably mounted in a bore 77 and has an outwardly-extending flange 78 cooperating with a shoulder 79 on the cover section 76 to limit its extreme movement toward the rack 61. The spring 58 is stronger than the spring 73.

With this construction, as the operator presses down on the foot pedal and thereby swings the arm 53 toward the left, the pinion 60 turns and moves the rack 61 toward the right in opposition to the spring 67 and this in turn swings the lever 38 toward its dotted-line position, with the result that the lever 34 swings out of operative connection with the pin 29, allowing relief valve 16 to close, and comes into operative engagement with the pin 30 for the inlet valve 22 operating thereon to open said valve and allow compressed air from the reservoir 6 to enter the brake system by way of port 24, chamber 23 and ducts 27 and 28 to the brake pipe 9. When the air enters the braking system some of it also passes from duct 28 to duct 46 and chamber 45 and acts to shift the rod outwardly against the action of the spring 47 and builds up a pressure sufficient to overcome it and cause a travel of the piston, and therefore the rod 40 associated with it, outwardly in direct proportion to the intensity of the pressure in the braking system, and causes the fulcrum point 41 for the operating lever 38 to move outwardly, the lower part of said lever being then held in the position that the rack 61 has been moved to by the operator. This outward shifting of the fulcrum 41 causes the lever 34 to swing away from the inlet-valve-operating pin 30 and thereby permits the inlet valve 22 to close, and at the same time this lever swings toward the operating pin 29 for the relief valve 16, but not so far as to move said pin as the lever 34 is then in its "lap" position due to the lost-motion between the ends of said lever 34 and the operating pins and between the levers 34 and 38, because of the pin 36 and slotted end 37 which therefore allows both valves 16 and 22 to retain their seats. Thus, on a certain limited swing of the operating lever 38 air is admitted to the brake system and a certain braking pressure applied to the brake through the pistons, not shown, operating in the brake cylinders 12, and the operating means is in a "lap" position in which both valves are closed and neither is again opened except by further movement by the operator of the foot pedal. If it is desired to increase the braking pressure, the lower part of lever 38 is swung further out by a further movement of the rack 61, the fulcrum on the rod 40 remaining stationary during this operation because of the balance between the brake pressure and the spring pressure, and this movement will again move the lever 34 and cause it to open the inlet valve, admitting more compressed air to the brake system and augmenting the pressure therein so that compensating piston 43 again moves outwardly to still further compress the spring 67, the tension of which is constantly increased as it is compressed, and this movement of the piston 43 again causes the fulcrum point 41 to assume another position at this higher pressure which will again cause the movement of the lever 34 to move to a "lap" position. Further depression of the foot pedal will cause a further increase of pressure in the brake system since the more the operator pushes down on said pedal the more air is admitted to the brake system and the greater the pressure becomes upon the brakes so that the degree of braking pressure may be controlled in this manner.

In order that the operator may be advised of the relative amount of brake pressure he is applying, the feeler mechanism consisting of the spring-pressed stop 74 is used, so associated with the rack 61 that with the first part of the rack's movement the operator moves the pedal against the spring 66 and thereafter, upon an increase of braking pressure, moves the pedal against the action of the spring 73, and because of the difference in force he must apply to overcome the resistance of these springs he knows whether he is applying the brakes or is making a light or a heavy application thereof. To adjust this mechanism, the part engaged by the rack is in the form of a screw bolt 74' in threaded engagement with the main part of the stop and secured in adjusted position by a sleeve lock nut 75' having its head 75" adapted to be engaged by a wrench.

As previously stated, under certain operating conditions it becomes advisable to limit the maximum braking pressure that may be applied and for this purpose a stop member 80 is adjustably mounted on the threaded outer end 67 of rack 62, and by engaging the inner side 81 of the case limits the movement of the rack, even though the operator is still moving the foot pedal 49 downward, since this movement may be taken up by the spring 58 without moving the rack.

The position at which this stop member 80 becomes operative is adjusted from the dash 18 by the turning of a long gear 82 in the casing 71 and meshing with the gear teeth 83 formed on the stop member 80. The hub 84 of the stop member is slidably mounted in a bore 85 in the cover 72 and while the stop member 80 may be turned so as to move toward or away from the side 81 to vary the travel of the rack 61, it does not turn when the gear 82 is stationary but simply slides along said gear. The gear 82 is turned by a hand-wheel 86 journalled in a fitting 87 on the dash and has a universal joint connection 88 with one end of a rod 89 which at its other end has a universal joint connection 90 with the exposed end of the shaft for the gear 82. The universal joint connections here shown each include a link 91 having pivot pins 92 and 93 at right angles to each other and connected to the adjacent parts. From the foregoing it will be noted that the nearer the gear is adjusted to the side 81 the less will be the travel of the rack and hence the less movement or movements of the lever 38 can be produced by the operator on his depression of the pedal 49, and hence the braking pressure admitted to the brake pipe 9 can be limited to best suit driving conditions. If desired, a pointer may be associated with the wheel 86 and a dial with the fitting 87, which dial will contain gradations showing the adjustment suitable for wet weather and other road conditions. With this arrangement the operator is prevented from using too much pressure even though he is careless about the operation of the foot pedal.

I desire it to be understood that this invention is not to be limited to any specific form or arrangement of parts except in so far as such limitations are included in the claims or necessitated by the prior art.

What I claim as my invention is:

1. In a vehicle braking apparatus, the combination with a brake system and its control valve mechanism, of means, actuated by the operator, to operate said control valve mechanism to make a brake application, and adjustable means limiting the extent of operation of said control valve mechanism and thereby limiting the amount of braking pressure that may be used by the operator.

2. In a vehicle braking apparatus, the combination with a brake system and its control valve mechanism, of means including a foot pedal actuated by the operator, to operate said control valve mechanism to make a brake application, and adjustable means, settable by the operator from his position in the vehicle, limiting the extent of operation of said control valve mechanism and thereby limiting the amount of braking pressure that may be used by the operator.

3. In a vehicle braking apparatus, the combination with a brake system and its control valve mechanism, of means including a member to operate said control valve mechanism and a foot pedal operatively connected to said member for movement with and relative thereto, and an adjustable stop associated with said member and controllable by the operator to limit the extent of movement of said member with said pedal and thereby limit the amount of braking pressure that may be used by the operator.

4. In a vehicle braking apparatus, the combination with brake control valve mechanism, of actuating means for said mechanism including a pedal-operated member, an adjustable gear having threaded connection with said member and forming a stop, a gear meshing with said adjustable gear, connections for turning said gear by the operator from his position within the vehicle, said stop limiting the extent of movement of said control valve mechanism and hence the braking pressure.

5. In vehicle braking apparatus, the combination with a brake system, of control valve mechanism associated therewith, operating means for said valve mechanism including a rack, a gear meshing with said rack, and a foot pedal having a connection to turn said gear and move relative thereto, and an adjustable stop member on said rack to limit the extent of its movement by said pedal and thereby control the operation of said control valve and limit the braking pressure.

6. In vehicle braking apparatus, the combination with a brake system, of control valve mechanism associated therewith, operating means for said valve mechanism including a rack, a gear meshing with said rack, and a foot pedal having a connection to turn said gear and move relative thereto, an adjustable stop member on said rack to limit the extent of its movement by said pedal and thereby control the operation of said control valve and limit the braking pressure, and means, operable by the operator from his position within the vehicle, to bring said stop to the desired position.

7. In vehicle braking apparatus, the combination with a brake system, of means actuated by the operator for admitting braking pressure to said system, and means settable by the operator to predetermine the maximum amount of braking pressure that may be admitted to said system.

8. In vehicle braking apparatus, the combination with a brake system, of control valve mechanism associated therewith, operating means for said valve mechanism including a rack, a gear meshing with said rack, a foot pedal having a connection to turn said gear and move relative thereto, a gear in threaded engagement with said rack and forming a stop to limit its travel in a brake-applying direction, a gear meshing with said stop gear and turnable by the operator from his position within the vehicle to move said stop gear to the desired position to thereby adjust the operation of said control valve mechanism for the maximum braking pressure desired.

9. In vehicle braking apparatus, the combination with a brake system, of control valve mechanism associated therewith, operating means for said valve mechanism including a rack, a gear meshing with said rack, a foot pedal having a connection to turn said gear and move relative thereto, a gear in threaded engagement with said rack and forming a stop to limit its travel in a brake-applying direction, a setting gear meshing with said stop gear, a handwheel mounted on the dash of the vehicle and connected to turn said setting gear to move said stop gear to the desired position, the limiting of the movement of said rack limiting the operation of said control valve mechanism to produce a predetermined maximum braking pressure in said brake system.

10. In a braking system, the combination with the control valve mechanism, of means for operating said mechanism including a foot pedal, and feeler mechanism including a spring-pressed stop having an adjustable abutment engaged by a part of said operating means.

In testimony whereof I affix my signature.

NIELS A. CHRISTENSEN.